(12) United States Patent
Fishman et al.

(10) Patent No.: US 11,277,694 B2
(45) Date of Patent: Mar. 15, 2022

(54) LASER-BASED DEVICES UTILIZING TEMPERATURE MODULATION FOR IMPROVED SELF-MIX SENSING

(71) Applicant: VocalZoom Systems Ltd., Yokneam Illit (IL)

(72) Inventors: Tal Fishman, Haifa (IL); Tal Bakish, Modi'in (IL)

(73) Assignee: VOCALZOOM SYSTEMS LTD., Yokneam Illit (IL)

(*) Notice: Subject to any disclaimer, the term of this patent is extended or adjusted under 35 U.S.C. 154(b) by 705 days.

(21) Appl. No.: 16/172,875

(22) Filed: Oct. 29, 2018

(65) Prior Publication Data

US 2019/0075402 A1 Mar. 7, 2019

Related U.S. Application Data

(63) Continuation-in-part of application No. 15/512,564, filed as application No. PCT/IB2016/054364 on Jul. 21, 2016, now Pat. No. 10,327,069, application No. 16/172,875, which is a continuation-in-part of application No. 15/790,002, filed on Oct. 22, 2017, now Pat. No. 10,448,172, which is a continuation of application No. 15/679,168, filed on Aug. 17, 2017, now abandoned, which is a continuation-in-part of application No. 15/017,639, filed on Feb. 7, 2016, now Pat. No. 9,755,755, which is a continuation of application No. 14/997,533, filed on Jan. 17, 2016, now Pat. No. 9,756,431, application No. 16/172,875, which is a continuation-in-part of application No. 15/511,642, filed as application No. PCT/IB2016/054416 on Jul. 25, 2016, now Pat. No.

(Continued)

(51) Int. Cl.
| H04R 23/00 | (2006.01) |
| H04B 10/50 | (2013.01) |
| H04B 10/564 | (2013.01) |
| H04R 23/02 | (2006.01) |

(52) U.S. Cl.
CPC ......... *H04R 23/008* (2013.01); *H04B 10/503* (2013.01); *H04B 10/506* (2013.01); *H04B 10/564* (2013.01); *H04R 23/02* (2013.01); *H04R 2410/00* (2013.01)

(58) Field of Classification Search
USPC ...... 372/29.02, 34, 38, 43, 44, 45, 46.01, 96
See application file for complete search history.

(56) References Cited

U.S. PATENT DOCUMENTS

| 6,574,257 B1* | 6/2003 | Thronton | ............... B82Y 10/00 250/216 |
| 2008/0063016 A1* | 3/2008 | Bhatia | ................... H01S 5/0612 372/34 |

* cited by examiner

*Primary Examiner* — Yosef K Laekemariam
(74) *Attorney, Agent, or Firm* — Eitan Mehulal Sadot (57) ABSTRACT

Laser-based devices utilizing temperature modulation for improved self-mix sensing. A self-mix laser unit includes: an active region having a first side and a second, opposite, side; a p-type Distributed Bragg Reflector (DBR) region, which is in direct touch with said first side of the active region; an n-type DBR region, which is in direct touch with the second side of the active region; and an n-type or p-type or other substrate. A heating unit provides modulated heating to the active region, either directly via an electrical resistor within the active region; or indirectly by passing or propagating modulated heat through one of the DBR regions or through the substrate. The modulated heating improves the laser-based self-mix signal.

17 Claims, 8 Drawing Sheets

Related U.S. Application Data

10,334,359, application No. 16/172,875, which is a continuation-in-part of application No. 15/512,844, filed as application No. PCT/IB2016/054417 on Jul. 25, 2016, now Pat. No. 10,555,079.

(60) Provisional application No. 62/580,087, filed on Nov. 1, 2017, provisional application No. 62/197,023, filed on Jul. 26, 2015, provisional application No. 62/197,106, filed on Jul. 27, 2015, provisional application No. 62/197,107, filed on Jul. 27, 2015, provisional application No. 62/197,108, filed on Jul. 27, 2015.

LASER-BASED DEVICES UTILIZING TEMPERATURE MODULATION FOR IMPROVED SELF-MIX SENSING

CROSS-REFERENCE TO RELATED APPLICATIONS

This patent application claims benefit and priority from U.S. provisional patent application No. U.S. 62/580,087, filed on Nov. 1, 2017, which is hereby incorporated by reference in its entirety.

This patent application is also a Continuation-in-Part (CIP) of U.S. patent application Ser. No. 15/512,564, filed on Mar. 19, 2017, which is hereby incorporated by reference in its entirety. The above-mentioned U.S. Ser. No. 15/512,564 was a national stage of PCT international application number PCT/IB2016/054364, filed on Jul. 21, 2016, which is hereby incorporated by reference in its entirety. The above-mentioned PCT/IB2016/054364 claimed benefit and priority from U.S. 62/197,023 (filed on Jul. 26, 2015) and from U.S. 62/197,106 (filed on Jul. 27, 2015) and from US 62/197,107 (filed on Jul. 27, 2015) and from U.S. 62/197,108 (filed on Jul. 27, 2015), and all of them are hereby incorporated by reference in their entirety.

This patent application is also a Continuation-in-Part (CIP) of U.S. patent application Ser. No. 15/790,002, filed on Oct. 22, 2017, which is hereby incorporated by reference in its entirety. The above-mentioned U.S. Ser. No. 15/790,002 was a continuation of U.S. Ser. No. 15/679,168 (filed on Aug. 17, 2017), which is hereby incorporated by reference in its entirety. The above-mentioned U.S. Ser. No. 15/679,168 was a Continuation-in-Part (CIP) of U.S. Ser. No. 15/017,639 (filed on Feb. 7, 2016), now U.S. Pat. No. 9,755,755, which is hereby incorporated by reference in its entirety. The above-mentioned U.S. Ser. No. 15/017,639 was a continuation of U.S. Ser. No. 14/997,533 (filed on Jan. 17, 2016), now U.S. Pat. No. 9,756,431, which is hereby incorporated by reference in its entirety.

This patent application is also a Continuation-in-Part (CIP) of U.S. Ser. No. 15/511,642, filed on Mar. 16, 2017, which is hereby incorporated by reference in its entirety; which was a National Stage of PCT international application number PCT/IB2016/054416, filed on Jul. 25, 2016, which is hereby incorporated by reference in its entirety. The above-mentioned PCT/IB2016/054416 claimed benefit and priority from US 62/197,023 (filed on Jul. 26, 2015) and from US 62/197,106 (filed on Jul. 27, 2015) and from US 62/197,107 (filed on Jul. 27, 2015) and from US 62/197,108 (filed on Jul. 27, 2015), and all of them are hereby incorporated by reference in their entirety This patent application is also a Continuation-in-Part (CIP) of U.S. Ser. No. 15/512,844, filed on Mar. 21, 2017, which is hereby incorporated by reference in its entirety; which was a National Stage of PCT international application number PCT/IB2016/054417, filed on Jul. 25, 2016, which is hereby incorporated by reference in its entirety. The above-mentioned PCT/IB2016/054417 claimed benefit and priority from US 62/197,023 (filed on Jul. 26, 2015) and from US 62/197,106 (filed on Jul. 27, 2015) and from US 62/197,107 (filed on Jul. 27, 2015) and from US 62/197,108 (filed on Jul. 27, 2015), and all of them are hereby incorporated by reference in their entirety

FIELD

The present invention relates to the field of devices that utilize laser beams.

BACKGROUND

Millions of people worldwide utilize a variety of electronic devices that may receive, capture or otherwise process audio signals. For example, cellular phones and smartphones comprise an audio microphone, allowing a user to conduct a telephone call with a remote user. Similarly, a smartphone typically comprises an audio microphone and a video camera, allowing the user to record an audio/video clip.

SUMMARY

Some embodiments of the present invention may comprise systems, devices, and method that utilize a laser beam, or multiple laser beams, able to perform laser-based self-mix self-mixing, or laser-based self-mixing interferometry or vibrometry in an enhanced or improved manner, or able to produce or utilize improved laser-based self-mix sensing, or having increased sensing capabilities for laser self-mix functionality or laser-based self-mix applications; as well as a laser-based self-mix sensor or unit that utilizes heat modification, temperature modification, heat modulation and/or heat modification in order to achieve increased sensitivity and/or efficiency.

The present invention may provide other and/or additional advantages and/or benefits.

DETAILED DESCRIPTION OF SOME DEMONSTRATIVE EMBODIMENTS

The present invention utilizes a laser or laser-based system, for example, a laser drive, a laser driver, a laser transmitter, and/or other laser or lased-based units. For example, a laser beam is generated and transmitted towards a remote target; e.g., towards a face or face-area or mouth or neck or mouth-area or neck-area of a human speaker, or towards a human target, or towards a non-human target (e.g., an article or object or equipment or item that needs to be remotely sensed or remotely characterized for various purposes, such as, to monitor its vibrations or stability or instability or other attributes; or a vibrating machine for machine half monitoring systems).

The laser beam hits the target, and is reflected back (or, optical feedback is reflected back) off the target. The reflected optical feedback or energy, or at least a portion thereof, is received back into the laser, acting as feedback. The reflected beam (or the reflected optical feedback or energy) mixes with the already existing internal beam of the laser (e.g., changing the laser gain), and modifies the laser output power. For example, such laser-based mixing or self-mixing may modify, increase or decrease the laser output power, depending on constructive or destructive feedback phase, which in turn depends on the target's distance (e.g., including, but not limited to, the exact distance from a facial skin due to minuscule vibrations of the skin of a human speaker, or due to vibrations or movements of the target) and/or depends on other attributes of the target. The modified laser-based self-mix power (that is, the self-mix laser output power) is detected by a monitor photo-diode (MPD) or photo-detector, and may be referred to as a laser-based self-mix signal. Alternatively, the laser-based self-mixing signal is monitor by measuring the laser junction voltage. The laser-based self-mix signal and its characteristics are analyzed or estimated or determined by a spectral analysis unit. The laser self-mix signal and its characteristics are indicative of the speed and/or distance and/or movement speed and/or vibration speed and/or vibrations characteristics of the target; e.g., the speed of movement of a facial skin portion of the human speaker that was hit by the laser beam and reflected it back towards the laser transmitter. The laser self-mix signal may be utilized for one or more purposes; for example, as a voice sensor or voice detector, to improve or enhance an acoustic signal or an audio signal (e.g., captured simultaneously by one or more acoustic microphones), and/or for other systems that utilize remote speed detection or measurement, or remote vibration-speed detection or measurement, and/or for systems that remotely sense and/or remotely characterize features of a human speaker and/or of a remote non-human object, and/or for purposes of remote distance detection or measurement and/or for purposes of remote velocity detection or measurement.

Accordingly, a laser device or a semi-conductor laser unit or a VCSEL may remotely sense target speed and/or distance and/or vibrations and/or for purposes of remote velocity detection or measurement, utilizing laser-based self-mixing effect which generates laser power oscillation that is proportional to the target speed or to the target velocity (and in this document, "speed" may be interpreted as "velocity") and distance. The change in laser power, for example, monitored by the MPD or photo-detector, outputs a changing electric current signal which is transformed or converted or translated into the estimated speed of movement (or vibration) of the target, via Fast Fourier Transform (FFT) and/or other transformation(s) and/or spectral analysis process, measuring or determining the Self-Mix (SM) oscillation rate. The SM signal characteristics may be used in order to estimate (or to improve or enhance) audio or acoustic signal(s) that were uttered or generated by the target (e.g., the human speaker), and/or in order to reduce or mitigate noise or interference or ambient acoustic signals (e.g., from the environment, from other humans, from a noise source). For example, if the self-mix signal indicates that no vibrations are detected at the human target, then an acoustic or audio sample that was captured at that time may be classified as noise or interference.

The MPD is positioned or located such that is collects at least some (but typically not all) of the oscillating laser power. The MPD may be monolithically integrated with the laser transmitter; or, the MPD may be a separate unit that is separate and non-integrated with the laser transmitter. The MPD monitors the back-side laser emission, or monitors the front-side laser emission (e.g., by using a beam-splitter).

In accordance with the present invention, laser-based devices and sensors, such as semi-conductor lasers, are used to sense target speed and target distance by utilizing Self-Mixing (SM) effect which generates laser power oscillations that are proportional to (or, which have a relation to) the target speed and the target distance. The laser power is monitored by a Monitor Photo-Detector or Monitor Photo-Diode (MPD) or by laser junction voltage measurement. The MPD current signal is transformed or converted or analyzed to yield the target's speed via one or more transformation processes, measuring the oscillation rate of the SM signal.

The Applicants have realized that when the target is moving (e.g., the target is a mouth region or a face region of a human speaker who is speaking), the frequency of the Self-Mix oscillation $f_{SM}$ is proportional to the target speed Vt; however, the direction of the target speed Vt may be is difficult to detect using a conventional frequency analysis process.

Additionally or alternatively, the frequency of the Self-Mix oscillation $f_{SM}$ is in a particular range, such as between a particular lowest value (DC, which may be Zero when the target is not moving at all) and a particular highest value $f_{SM}^{MAX}$, thereby making it more difficult to analyze due to low frequency noise near the lower end of that frequency range (DC).

Some implementations may modulate the laser driver current, such as by a triangle wave or in order to achieve a triangular wave of the laser current; and in turn, the modulation current modulates the laser wavelength, such as by changing the laser's internal temperature. The resulting Self-Mix signal is oscillating at frequency $f_0$ that may be referred to as the "carrier frequency" of the Self-Mix signal. When the target is not moving (e.g., the human speaker is silent), the same frequency is identified at both upward slopes and downward slopes of the modulation wave being analyzed. When the target is moving (e.g., the human speaker is uttering speech), the frequency difference between the upward slope and a nearby downward slope is indicative of (and may allow remote measuring or sensing or estimation of) the speed of movement of the target; and such implementation may be used for resolving both the speed-direction problem and the low frequency noise (near the DC) problem.

Figure 2:
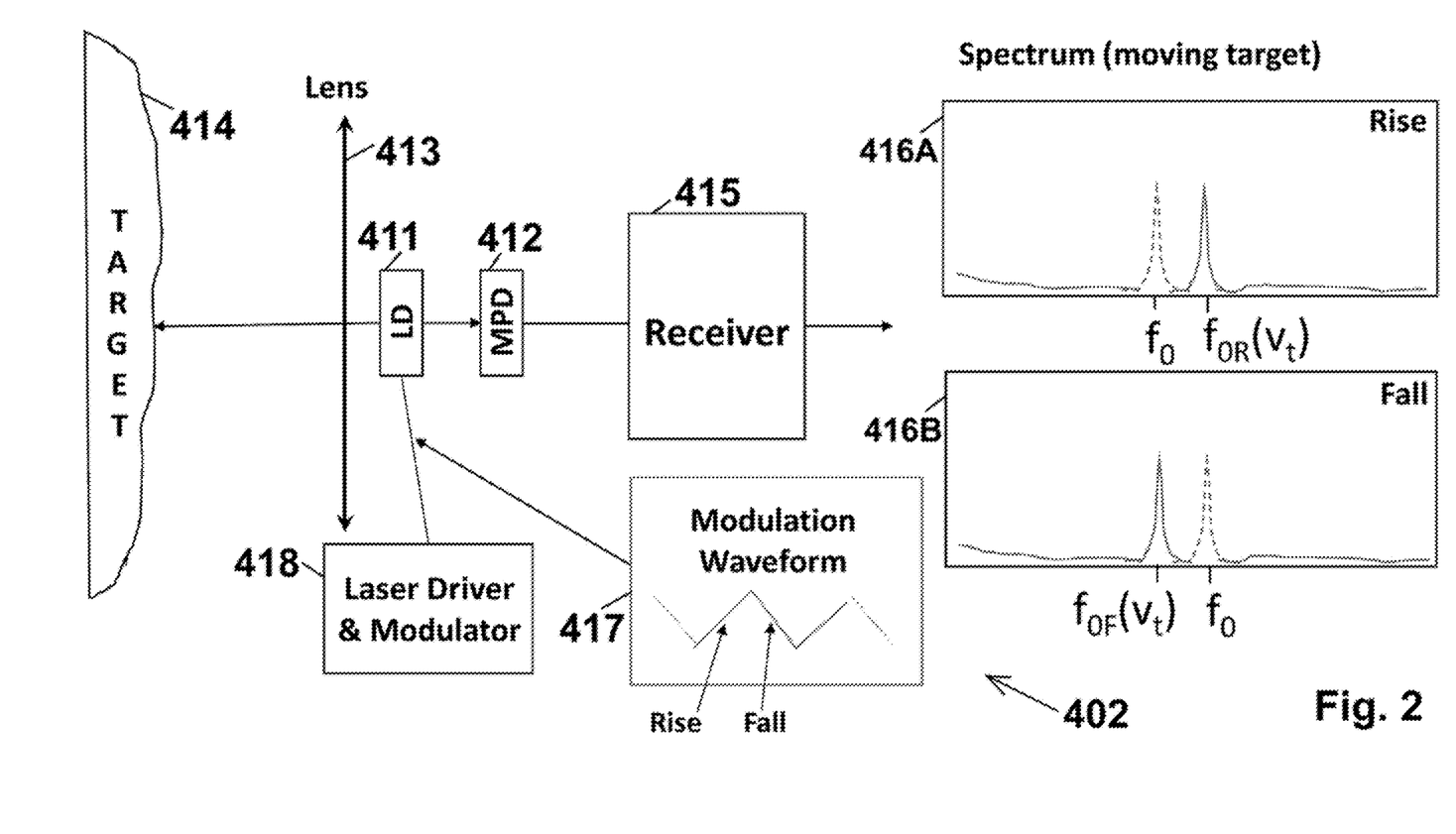
FIG. 2 is a schematic illustration of a system, in accordance with some demonstrative embodiments of the present invention.

This is demonstrated in FIG. 2, which is a schematic illustration of a system 402 in accordance with some demonstrative embodiments of the present invention. For example, when the target is not moving (e.g., when the human speaker is silent), the frequency of both the upward slope and the downward slope is at $f_0$; whereas, if the target is moving towards a first direction (e.g., a positive direction) then the frequency of upward slope is increasing and the frequency of the downward slope is decreasing; whereas, if the target is moving towards a second, opposite, direction (e.g., a negative direction) then the frequency of the downward slope is increasing and the frequency of the upward slope is decreasing; for example, if the upward slope frequency is greater then the speed direction is forward, whereas if the upward slope frequency is smaller then the speed direction is backwards.

The above-described implementation may create problems; such as, that in order to modulate the laser current at a triangle wave, the band-width (BW) of the laser driver is increased, and thus the laser signal becomes noisier, or the noise of the laser signal is increased; the self-mix sensor is highly sensitive to such noise, and the efficiency of the SM sensing decreases.

The present invention utilizes other (e.g., alternative and/or additional) methods to modulate the laser wavelength; particularly by utilizing heat modulation or temperature modulation or heat modification or temperature modification, which in turn may enable utilization of a very low band-width laser driver (e.g. bandwidth<10 Hz) and/or may increase the laser-based self-mixing performance or efficiency or accuracy.

Although portions of the discussion herein may relate, for demonstrative purposes, to Vertical Cavity Surface Emitting Laser (VCSEL), embodiments of the present invention may be similarly utilized with other suitable types of laser units, laser drivers, laser transmitters, laser devices, laser generators, laser sensors, edge-emitting laser units, Distributed Bragg Reflector (DBR) based laser units, Distributed Feedback (DFB) laser units, fiber-laser units, or the like.

Figure 1A:
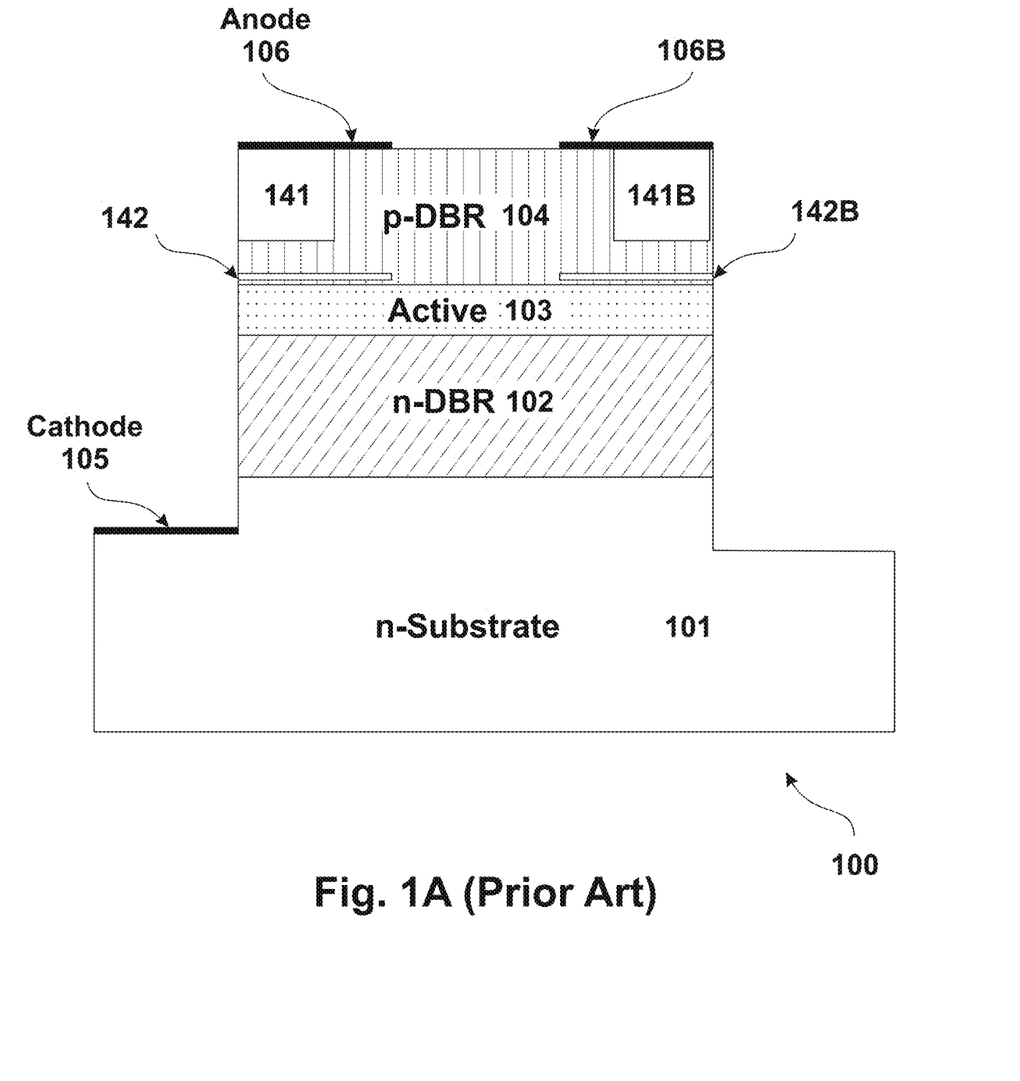
FIGS. 1A and 1B are schematic illustrations of prior art laser structures.
Figure 1B:
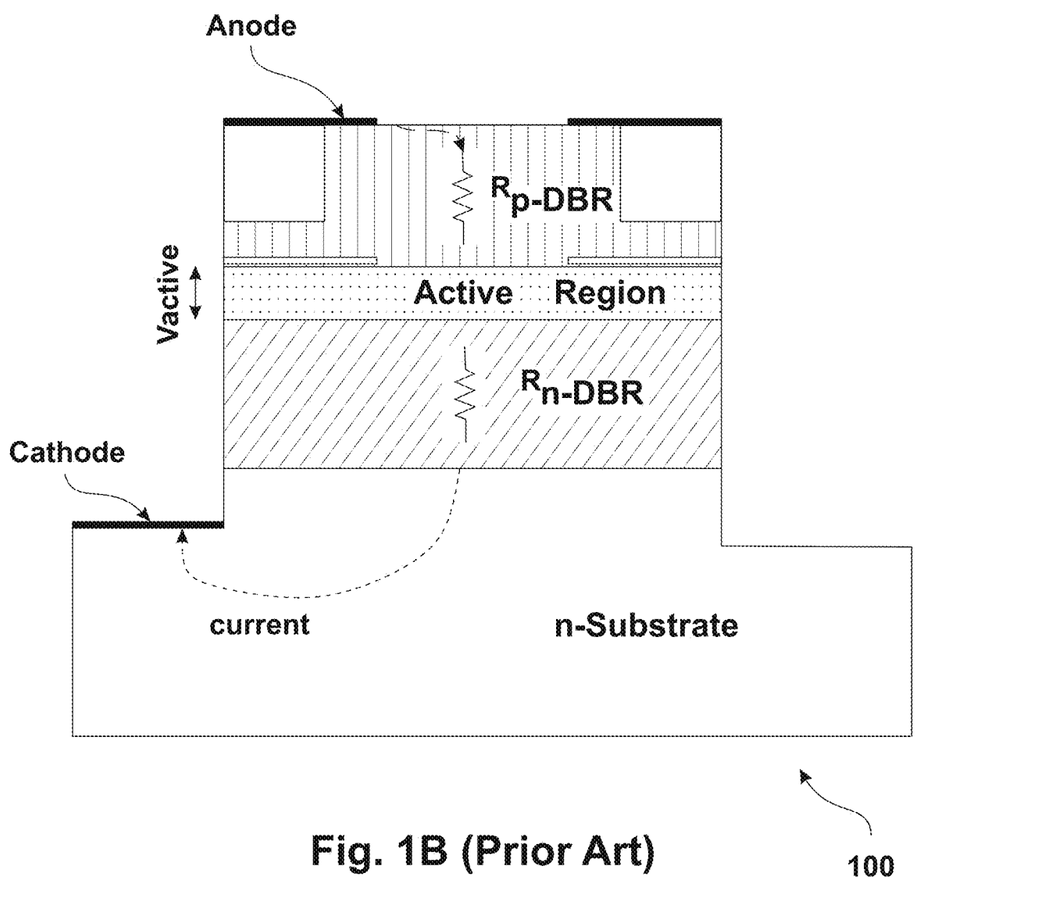

Reference is made to FIGS. 1A and 1B, which are schematic illustrations of a prior art laser structure 100; which comprises: a n-type substrate 101; a bottom n-type Distributed Bragg Reflector (DBR) layer 102; an active region 103; a top p-type DBR layer 104; and a corresponding bottom Cathode Contact 105 and a top Anode Contact 106 that are connected (respectively) to the n side and the p side. The contacts 105-106 supply the current (I) to the Laser Diode (ILD) that provides a lasing gain to the active region 103. The active region 103 may comprise several layers in which typically 1 to 3 layers act as quantum-wells that amplifies the light (the active area), and some additional spacing layers or buffering layers or filler layers, such that the total thickness of the active region is $\lambda/4$, where $\lambda$ is the wavelength in the material. The contacts 105-106 may be connected to a current source and/or to the laser driver. The resulting voltage between the Anode Contact 106 and the Cathode Contact 105, denoted Vtotal, is a sum of the voltages that develop on the various regions in the current path, as demonstrated in FIG. 1B. Apart from the active voltage, denoted Vactive, a contribution to the resulting voltage Vtotal comes from the p-DBR resistance, denoted $R_{p\text{-DBR}}$. Also shown are Current Limiting Zone (141, 141B) and Oxidation Layer (142, 142B) (or oxidation region).

It is noted that FIG. 1A and FIG. 1B depict a cut-through (or cross-section) side-view of the laser structure 100, which may in reality be a three-dimensional object which may be structured similarly to a bagel shape or doughnut shape or ring shape; such that right-to-left symmetry may be attributed to elements shown in FIG. 1A and FIG. 1B, and such that elements shown on the right side are three-dimensionally connected to corresponding elements shown on the left side; for example, such that Anode 106B corresponds to Anode 106, and such that Current Limiting Zone 141B corresponds to Current Limiting Zone 141; and such that Oxidation Layer 142B (for limiting the optical aperture) corresponds to Oxidation Layer 142.

The Applicants have realized that when a current flows through this structure (e.g., through one of the DBR layers, and/or through the active region), heat is generated mostly at one of the DBR layers or at both of the DBR layers, or particularly at the p-DBR which has higher resistance, and/or at the active region due to the amount of electrons/holes that are recombined in non-radiative processes thereby generating heat rather than light. The generated heat modifies the active region refractive index, and/or modifies the effective thickness of the active and DBR mirror regions, thereby modifying the effective cavity length which thus modifies the lasing wavelength. The Applicants have realized that modulating the heat generation may be utilized in combination with (or instead of) performing Current modulation, in order to modulate the laser temperature and thus the laser wavelength. The change in the laser wavelength $\lambda$ as a function of the change in the laser current ($I_{LD}$) may be referred to as dWL/dI, or may be denoted in short as DWL.

Figure 3:
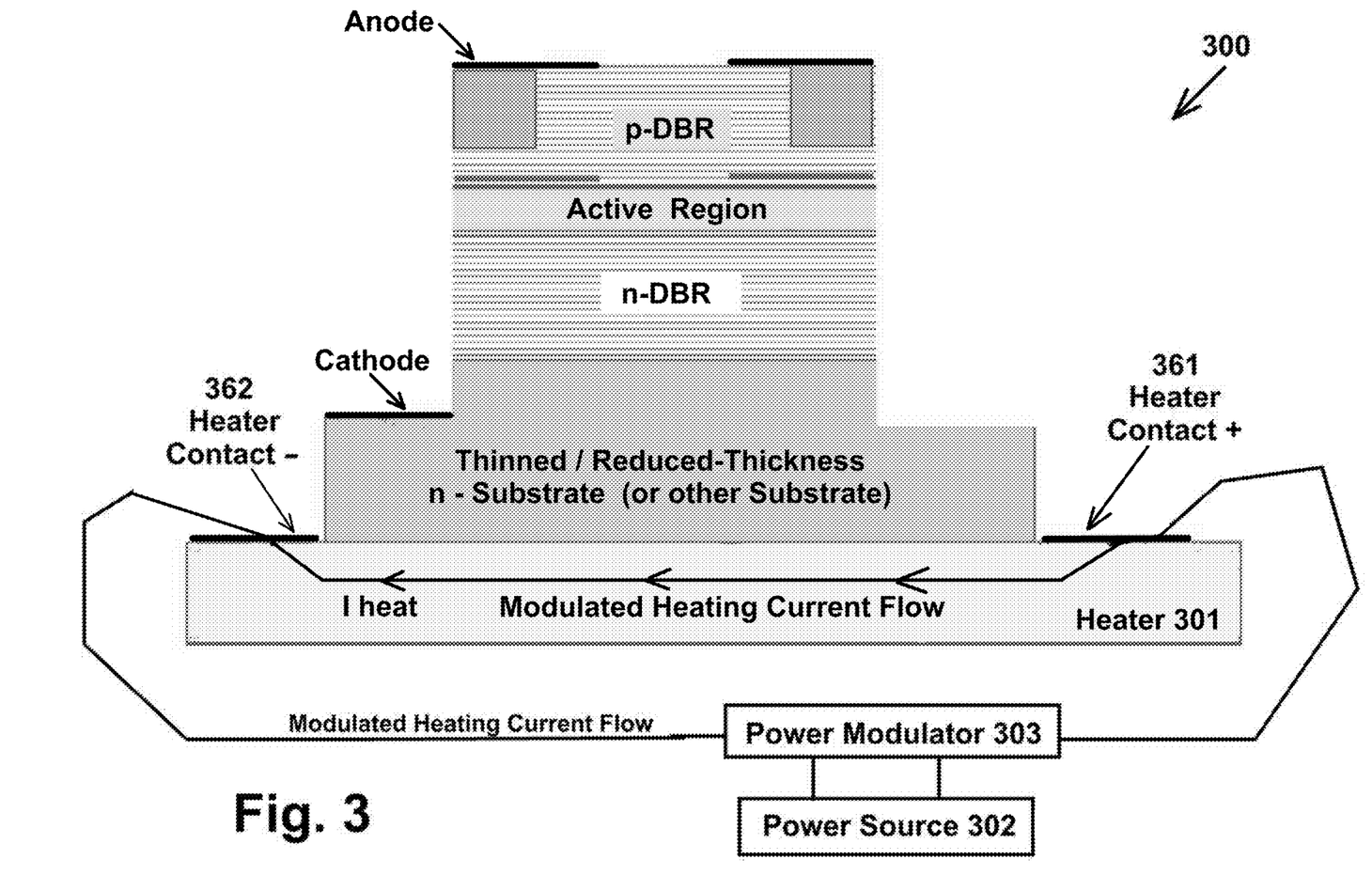
FIG. 3 is a schematic illustration of a laser structure, in accordance with a first set of embodiments of the present invention.

Reference is made to FIG. 3, which is a schematic illustration of a laser structure 300, in accordance with a first set of embodiments of the present invention. The laser structure is placed on top of (or is glued or connected or attached to, or is coupled to, or is mounted on, or is monolithically integrated with) a lower-side heater unit 301 (e.g., comprising or being an electrical resistor, and/or a Thermal Electric Cooler (TEC)). The lower-side heater unit 301 is touching, or is adjacent to, the n-substrate. Laser structure 300 (as well as other laser structures that are described and/or depicted herein) may be part of a VCSEL, or an edge-emitting laser, or other suitable laser device.

The current or the voltage is (or are) supplied to that heater unit 301 (e.g., the resistor and/or TEC) from a power source 302 through electrical contacts 361-362. The supplied current (denoted as $I_{heat}$) or voltage is (or are) modulated (or otherwise modified, or pre-modulated or pre-modified, externally to the heater unit 301) via a power modulator unit 303. In one example, the heater power is modulated or is modified to have a triangle shape, such that the triangular heat supply heats the nearby laser unit in a modulated or regulated manner; which in turn causes the desired modulation of the laser wavelength, and enables improved analysis of the laser-based self-mix signal. For example, the modulated heating may transfer or may propagate, directly or indirectly, to or towards the active region of the laser (e.g., the laser gain medium; the laser gain media; the media for laser amplification; or other gain medium which may compensate for optical losses in a laser cavity or laser resonator), and/or to or towards the n-type DBR region and/or the p-type DBR region; and may directly or indirectly modify or modulate the size and/or dimensions and/or thickness and/or height and/or the refractive index of the active region and/or of the laser cavity and/or the DBR regions (or, at least some of the DBR mirrors or DBR layers in such DBR regions) that are located in proximity to the active region; thereby modifying and/or modulating the wavelength of the laser, and thereby enabling improved or enhanced analysis of the laser-based self-mix signal.

The improvement(s) in the laser-based self-mix signal, or the improvement in its analysis, may be of one or more characteristics; for example, improvement of the bandwidth of the laser-based self-mix signal; improvement in the reliability or quality of the laser-based self-mix signal; reduction or elimination of laser-based speckles noise; reduction of other noises from the laser-based self-mix signal; increase in the ability of a spectral analysis unit or a self-mix interferometry unit to extract or analyze or determine characteristics of the remote target based on analysis of the laser-based self-mix signal; and/or other improvements or enhancements.

In a demonstrative implementation of some demonstrative embodiments of the invention, the heater unit 301 may comprise a resistor having heat power denoted $P_{heat}$, such that $P_{heat}(t) \equiv I_{heat}^2 R$. Furthermore, if $I_{heat} = I_{dc} + i_{ac}(t)$ (where $I_{dc} \gg i_{ac}(t)$), then we can approximate $P_{heat}$ as $P_{heat}(t) \approx (I_{DC}^2 + 2I_{DC}i_{ac}(t))R$. In such case, triangular modulation current $i_{ac}(t)$ creates a triangular power modulation. In the above-mentioned example, R indicates the electrical resistance of the heater unit 301; DC indicates Direct Current, $I_{DC}$ indicates the static component of the current, $i_{ac}$ indicates changing component (AC) of the current, P indicates power, and t indicates time. Other suitable parameters and/or calculations may be used.

In some embodiments, the thickness of the substrate may be reduced, or a reduced-thickness substrate is used, or a thinner substrate is used, in order to compensate for the distance between heater unit and the active area of the VCSEL, since the greater this distance is, the smaller are the rate or the effectiveness of such heat-based modulation. For example, instead of utilizing a conventional n-type substrate having a thickness in the range of 150 to 250 micrometers, a thinned or reduce-thickness n-type substrate may be used, having a thickness of, for example: n-type substrate thickness of less than 100 micrometers; n-type substrate thickness of less than 80 micrometers; n-type substrate thickness of less than 50 micrometers; n-type substrate thickness of less than 40 micrometers; n-type substrate thickness of less than 30 micrometers; n-type substrate thickness of less than 20 micrometers; n-type substrate thickness of less than 15 micrometers; n-type substrate thickness in the range of 10 to 100 micrometers; n-type substrate thickness in the range of 10 to 75 micrometers; n-type substrate thickness in the range of 10 to 50 micrometers; n-type substrate thickness in the range of 10 to 35 micrometers; n-type substrate thickness in the range of 10 to 20 micrometers; or other suitable values or ranges or reduced thickness.

Figure 4A:
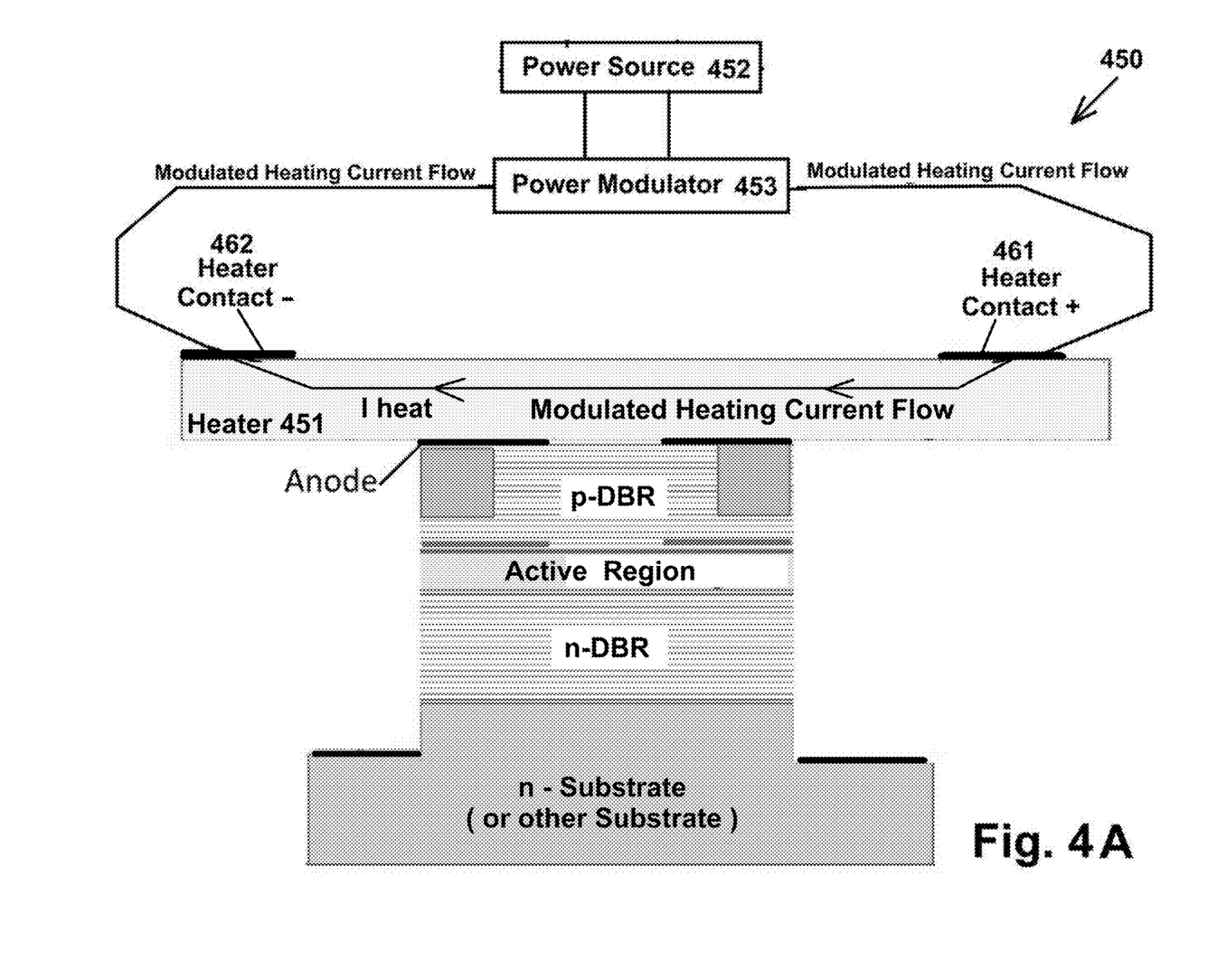
FIG. 4A is a schematic illustration of a laser structure, in accordance with a second set of embodiments of the present invention.

Reference is made to FIG. 4A, which is a schematic illustration of a laser structure 450, in accordance with a second set of embodiments of the present invention. The laser structure is placed under (or is glued or connected or attached to, or is coupled to, or is mounted on or under, or is monolithically integrated with) a top-side heater unit 451 (e.g., comprising or being an electrical resistor). The top-side heater unit 451 is touching, or is adjacent to, the top side or the top area of the laser structure 450.

It is noted that FIG. 4A shows a side-view or a cross-sectional view of the laser structure 450, therefore the top-side heater unit 451 appears as having a side-view that is generally rectangular; however, in some implementations, laser structure 450 or portions thereof, and/or particularly the top-side heater unit 451, may be structured as a ring-shaped or bagel-shape object, having a hollow portion or cavity or aperture or generally-central aperture therein, in order to allow the laser beam to emit out of (e.g., upwardly from) the laser structure 450.

Figure 4B:
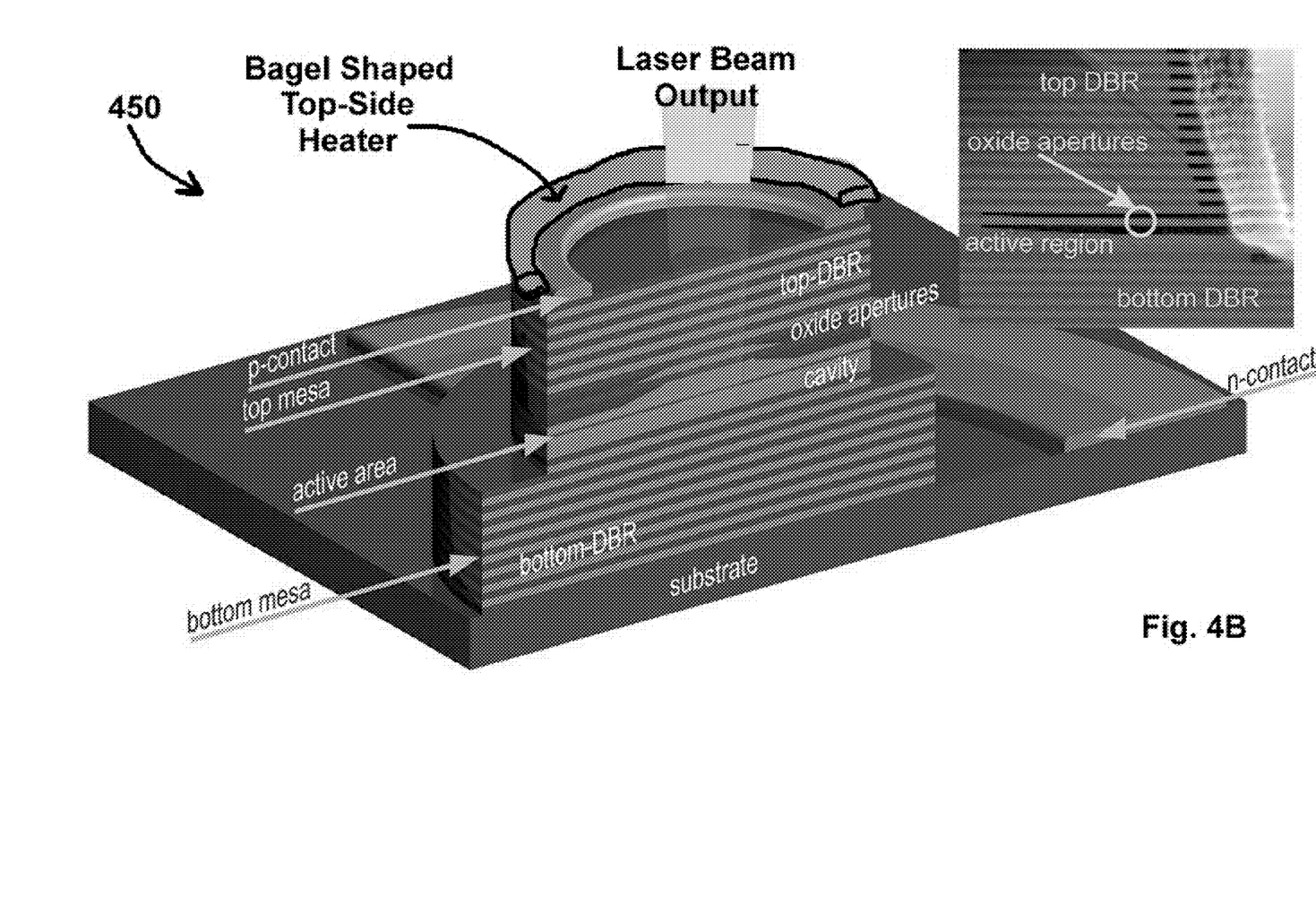
FIG. 4B is a schematic illustration of a perspective view of a cross-section of a laser structure, in accordance with the second set of embodiments of the present invention.

Reference is made to FIG. 4B, which is a schematic illustration of a perspective view of a cross-section of laser structure 450, in accordance with the second set of embodiments of the present invention. As demonstrated, the top-side heater unit 451 is ring-shaped or is bagel-shaped, and does not cover the entirety of the top-side DBR; in order to allow passage and exit of the laser beam. It is noted that for demonstrative purposes, the top-side heater unit 451 is shown as located above or near the p-contract ring; however, in some implementations, the top-side heater unit 451 may be located in other suitable locations at or near the top-side of the laser structure 450, for example, as an internal ring which is internal to the p-contact ring, or as a stair-shaped ring that covers on top of the p-contact ring and also is internal to the p-contact ring, or as a ring that is external to the p-contact ring, or the like.

The current or the voltage that is (or are) supplied to that resistor from a power source 452, is (or are) modulated (or otherwise modified) via a modulator unit 453. The heater drive power is modulated or is modified in a controlled or regulated manner, to have a triangle shape; thereby creating a triangular heat supply that heats the nearby laser unit in a modulated or regulated manner; which in turn causes the desired modulation of the laser signal, and enables improved analysis of the laser-based self-mix signal.

In some embodiments, the systems of FIGS. 4A and/or 4B may enable to have the heater unit at a closer distance to the active region of the laser structure (e.g., by at least 1 or 5 or 10 or 50 microns closer), since in FIGS. 4A and/or 4B (unlike in FIG. 3) there is no n-substrate medium that separates between the heater unit and the active region.

Figure 5:
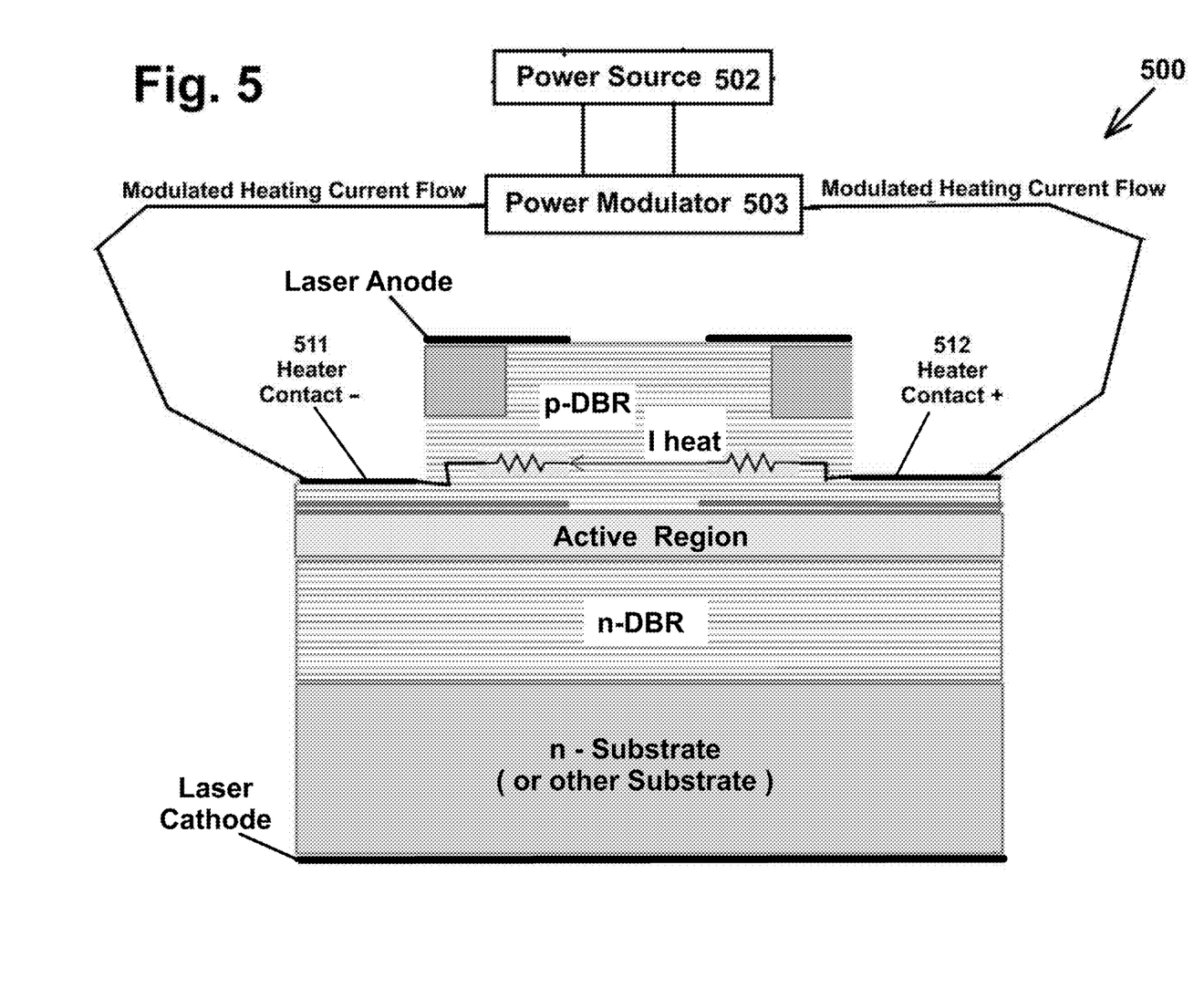
FIG. 5 is a schematic illustration of a laser structure, in accordance with a third set of embodiments of the present invention.

Reference is made to FIG. 5, which is a schematic illustration of a laser structure 500, in accordance with a third set of embodiments of the present invention. The laser structure is being heated internally, in a modulated or regulated manner, via a lateral current flow of an additional Heating Current that passes, for example, laterally through the p-DBR region. Additional contacts are located on opposite sides of the mesa, to enable modulated heat generation via a modulated or pre-modulated driving current, laterally along the DBR layers, such as laterally along the p-DBR region.

As demonstrated, two additional electrical contacts 511-512 are located, for example on each side of the laser structure; they receive current or voltage from a power source 502, via a power modulator unit 503 able to modulate (or otherwise regulate) the provided current or voltage. The Heating Current flows laterally within the p-DBR layer (e.g., the p-DBR mirror), while also directly heating (e.g., in a modulated or regulated manner) the nearby Active Region of the laser structure.

The electrical resistivity of the p-DBR layer (e.g., the multiple p-AlGaAs DBR layers) may be pre-defined or pre-set based on its doping properties. For example, for doping at the level of $N=1e18$ $1/cm^3$, resistivity density may be in the range of 0.01 to 0.1 Ohm-cm, assuming a $30\times30$ $micron^2$ square mesa and 0.1 micron thick channel in which the Heating Current flow, which leads to a range of 100 to 1000 Ohm resistivity that creates heat while conducting current. Other suitable values or ranges may be used.

In some embodiments, an n-type substrate may be used, or a p-type substrate may be used, or a non −n type substrate may be used, or a doped substrate may be used, or a semi-insulating substrate may be used, or a non-doped substrate may be used.

In some embodiments, a VCSEL in accordance with the present invention may have reverse doping, such that the bottom is p-type whereas the top is n-type.

For demonstrative purposes, FIG. 5 shows the heating unit/the resistor as passing laterally through the p-type DBR region; however, in other embodiments of the present invention, the heating unit/the resistor may pass, instead, through the n-type DBR region, and may provide the modulated heating to the active region via that n-type DBR region. In some other embodiments, optionally, two modulated heating units may be used; for example, a first modulated heating unit (e.g., a first resistor) passing laterally through the p-type DBR region, and a second modulated heating unit (e.g., a second resistor) passing laterally through the n-type DBR region; and optionally, the two resistor may be identical, or may be different from each other in order to enable different modulation or different heating of the active region; and optionally, two identical heating modulation schemes may be used for the two resistors, or alternatively, two different heating modulation schemes may be used for the two resistors in order to provide two different modulations.

Referring to FIGS. 3-5, it is clarified that these drawings or some of them, or the text that describes them, may refer to a particular DBR region as a "p-type DBR region", and may refer to another particular DBR region as an "n-type DBR region"; however, these "p-type" and "n-type" are depicted for demonstrative purposes, and other embodiments of the present invention may comprise alternate implementations in which the "p-type DBR region" and the "n-type DBR region" are switched in their location, or such that a heating unit that is depicted within (or in proximity to) the "p-type DBR region" is, instead, implemented within (or in proximity to) the "n-type DBR region"). Accordingly, the "DBR region(s)" or "p-type DBR region" or "n-type DBR region" may be interchangeable or switch-able in some implementations, and such terms may include other types of DBR layers or DBR mirrors or DBR mirror layers, which may optionally be p-type or n-type; and which may be located, for example, on top of the active region, or beneath or under or at the bottom of the active region, or may be directly touching or directly contacting the active region or otherwise bordering it, or may optionally be directly touching a substrate, or may optionally be "sandwiching" or surrounding or encapsulating the active region (or a portion thereof) within two DBR regions (e.g., between a p-type DBR region and an n-type DBR region).

Figure 6:
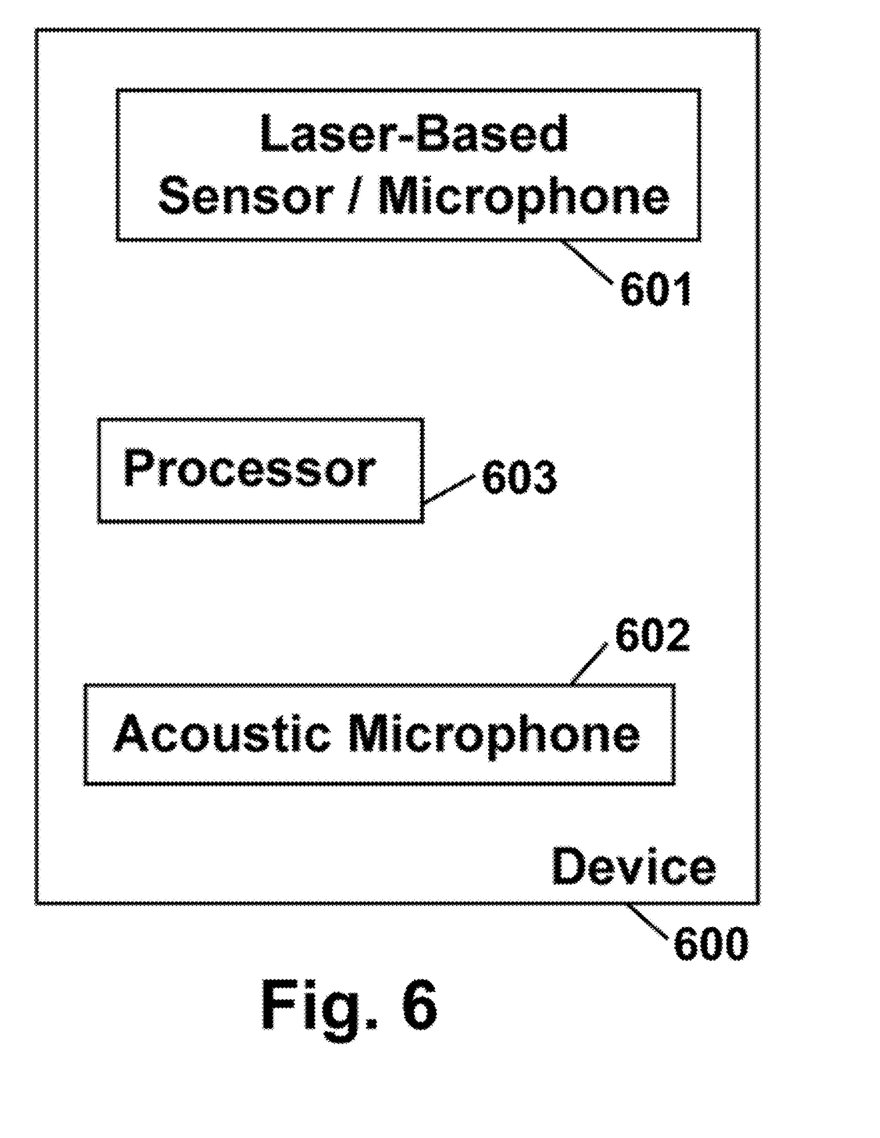
FIG. 6 is a schematic block-diagram illustration of a device, in accordance with some demonstrative embodiments of the present invention

Reference is made to FIG. 6, which is a schematic block-diagram illustration of a device 600, in accordance with some demonstrative embodiments of the present invention. Device 600 may comprise: a laser-based sensor/microphone 601, which may comprise a laser unit similar to one or more of the laser unit(s) described above. Device 600 may optionally comprise also: an acoustic microphone 602 able to capture acoustic signals; and a processor 603 able to process acoustic signals captured by the acoustic microphone 602 and/or optical feedback received by (or the self-mix signal generated by) the laser-based sensor/microphone 601. It is noted that device 600 is only a non-limiting example; and that embodiments of the present invention may be utilized for other purposes or as part of other types of systems, for example, for remote sensing of characteristics or attributes of a non-human target (e.g., remote sensing of machine vibrations or equipment vibrations).

Device 600 may comprise one or more other suitable hardware components and/or software units, which are not shown in order to avoid over-crowding of the drawing; for example, a processor, a processor core, a CPU, a DSP, a GPU, a memory unit (e.g., RAM, Flash memory), a storage unit (e.g., hard disk drive, solid state drive), a wireless transceiver (e.g., Wi-Fi, Bluetooth, Zigbee, cellular), an antenna, an input unit (e.g., keyboard, keypad, touch-pad, touch-screen, on-screen keyboard, buttons, sliders, microphone, mouse, stylus), an output unit (screen, display unit, monitor, touch-screen, speakers), a power source (e.g., battery, rechargeable battery, power cell), accelerometer, gyroscope, compass, GPS unit, location-determining unit or sensor, an Operating System (OS), one or more applications or "apps", or the like.

Device 600 may be, or may comprise, or may be comprised in, for example: a smartphone, a cellular phone, a cordless phone, a tele-conference device or system, a video-conference device or system; an audio/video sensor; a computer, a laptop computer, a notebook computer, a desktop computer, a tablet, a gaming device, a gaming console, a navigation device, a mapping device, a route-guidance device; a vehicle, a motor vehicle, a self-driving vehicle, an autonomous vehicle; a vehicular dashboard, a vehicular component, a vehicular device, a vehicular dashboard device; an Augmented Reality (AR) gadget or gear or helmet or glasses or headset; a Virtual Reality (VR) gadget or gear or helmet or glasses or headset; a smart-watch; a fitness watch or device; a portable electronic device; a kiosk type device, an Automatic Teller Machine (ATM), an automated banking machine; a cash register, a Point-of-Sale (PoS) device; and/or other suitable device or system.

Some embodiments of the present invention may comprise and/or may utilize, one or more components and/or operations and/or units and/or systems and/or methods that are described in any of the following United States patents, all of which are hereby incorporated by reference in their entirety: U.S. Pat. Nos. 7,775,113; 8,286,493; 8,949,118; 9,311,928; 9,344,811; 9,536,523; 9,661,424; 9,661,424; 9,666,191; 9,741,344.

The term "acoustic microphone" as used herein, may comprise one or more acoustic microphone(s) and/or acoustic sensor(s); or a matrix or array or set or group or batch or arrangement of multiple such acoustic microphones and/or acoustic sensors; or one or more sensors or devices or units or transducers or converters (e.g., an acoustic-to-electric transducer or converter) able to convert sound into an electrical signal; a microphone or transducer that utilizes electromagnetic induction (e.g., a dynamic microphone) and/or capacitance change (e.g., a condenser microphone) and/or piezoelectricity (e.g., a piezoelectric microphones) in order to produce an electrical signal from air pressure variations; a microphone that may optionally be connected to, or may be associated with or may comprise also, a pre-amplifier or an amplifier; a carbon microphone; a carbon button microphone; a button microphone; a ribbon microphone; an electret condenser microphone; a capacitor microphone; a magneto-dynamic microphone; a dynamic microphone; an electrostatic microphone; a Radio Frequency (RF) condenser microphone; a crystal microphone; a piezo microphone or piezoelectric microphone; and/or other suitable types of audio microphones, acoustic microphones and/or sound-capturing microphones.

The term "laser microphone" as used herein, may comprise, for example: one or more laser microphone(s) or sensor(s); one or more laser-based microphone(s) or sensor(s); one or more optical microphone(s) or sensor(s); one or more microphone(s) or sensor(s) that utilize coherent electromagnetic waves; one or more optical sensor(s) or laser-based sensor(s) that utilize vibrometry, or that comprise or utilize a vibrometer; one or more optical sensor(s) and/or laser-based sensor(s) that comprise a self-mix module, or that utilize self-mixing interferometry measurement technique (or feedback interferometry, or induced-modulation interferometry, or backscatter modulation interferometry), in which a laser beam is reflected from an object, back into the laser, and the reflected light interferes with the light generated inside the laser, and this causes changes in the optical and/or electrical properties of the laser, and information about the target object and the laser itself may be obtained by analyzing these changes.

The terms "vibrating" or "vibrations" or "vibrate" or similar terms, as used herein, refer and include also any other suitable type of motion, and may not necessarily require vibration or resonance per se; and may include, for example, any suitable type of motion, movement, shifting, drifting, slanting, horizontal movement, vertical movement, diagonal movement, one-dimensional movement, two-dimensional movement, three-dimensional movement, or the like. In some embodiments, measuring or detecting or estimating "vibrations" of a target may include, for example, measuring or detecting or estimating a speed (or velocity) of movement of the target, or of the speed in which the skin of the target moves or vibrates, or other characteristics that characterize the movement or displacement or folding or skin or face-skin or body-skin when (or due to) speech uttered by a human speaker.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention.

In some embodiments which may optionally utilize a laser microphone or optical microphone, such optical microphone (or optical sensor) and/or its components may be implemented as (or may comprise) a Self-Mix module; for example, utilizing a self-mixing interferometry or vibrometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes.

The present invention may be utilized in, or with, or in conjunction with, a variety of devices or systems that may benefit from noise reduction and/or speech enhancement; for example, a smartphone, a cellular phone, a cordless phone, a video conference system or device, a tele-conference system or device, an audio/video camera, a web-camera or web-cam, a landline telephony system, a cellular telephone system, a voice-messaging system, a Voice-over-IP system or network or device, a vehicle, a vehicular dashboard, a vehicular audio system or microphone, a navigation device or system, a vehicular navigation device or system, a mapping or route-guidance device or system, a vehicular route-guidance or device or system, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, a device or system or module that utilizes speech-based commands or audio commands, a device or system that captures and/or records and/or processes and/or analyzes audio signals and/or speech and/or acoustic signals, and/or other suitable systems and devices.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

In some embodiments, an apparatus comprises a hybrid acoustic-and-optical sensor which includes at least: a laser-based microphone able to remotely sense vibrations of a facial-area of a human speaker while said apparatus is not in physical contact with human speaker; and an acoustic microphone able to capture acoustic signals generated by said human speaker; wherein the apparatus further comprises a processor to enhance the acoustic signals, that are captured by said acoustic microphone, based on vibrations of the facial-area of the human speaker that are sensed remotely by the laser-based microphone.

Some embodiments of the present invention provide a device which includes a self-mix laser unit comprising: an active region having a first side and a second, opposite, side; a p-type Distributed Bragg Reflector (DBR) region, which is in direct touch with said first side of said active region; an n-type DBR region, which is in direct touch with said second side of said active region; a substrate; a heating unit, directly touching said substrate, to receive modulated power and to indirectly provide modulated heat to at least said active region by generating heat that passes to the active region through the substrate.

In some embodiments, said heating unit in non-touching the n-type DBR region; said heating unit in non-touching the active region; said heating unit in non-touching the p-type DBR region. In some embodiments, said heating unit indirectly provides modulated heat to said active region via said substrate which has a thickness smaller than 100 micrometers. In some embodiments, the heating unit is an electrical resistor, which receives modulated current from a modulated current source, or which receives modulated voltage from a modulated voltage source. In some embodiments, the heating unit is an electrical resistor, which receives triangular-modulated electrical power from a triangulate-modulated power source, and which indirectly provides triangular-modulated heating to said active region.

In some embodiments, the self-mix laser unit is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit; wherein said heating unit provides modulated heating that indirectly heats said active region and which improves a quality of said laser-based self-mix signal; wherein said modulated heating operates to modulate a wavelength of the outgoing laser beam. In some embodiments, the self-mix laser unit is part of a Vertical Cavity Surface Emitting Laser (VCSEL). In some embodiments, the laser power, if said target is non-moving, is oscillating in a rate proportional to a change rate of said modulation; wherein the laser power, if said target is moving, is oscillating in a rate proportional to said rate of modulation change and said target speed.

Some embodiments provide an apparatus which includes a self-mix laser unit comprising: an active region having a first side and a second, opposite, side; a top side Distributed Bragg Reflector (DBR) region, which is in direct touch with said first side of said active region; a bottom side DBR region, which is in direct touch with said second side of said active region; a substrate; a heating unit, directly touching said tope side DBR region, to receive modulated power and to indirectly provide modulated heat to at least said active region via said top side DBR region. In some embodiments, said heating unit in non-touching the active region; wherein said heating unit in non-touching the substrate.

In some embodiments, the heating unit is an electrical resistor, which receives modulated current from a modulated current source, or which receives modulated voltage from a modulated voltage source. In some embodiments, the heating unit is an electrical resistor, which receives triangular-modulated electrical power from a triangulate-modulated power source, and which indirectly provides triangular-modulated heating to at least said active region via said top-side DBR region. In some embodiments, the self-mix laser unit is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit; wherein said heating unit provides modulated heating that indirectly heats at least said active region and which improves a quality of said laser-based self-mix signal; wherein said modulated heating operates to modulate a wavelength of the outgoing laser beam. In some embodiments, the self-mix laser unit is part of a Vertical Cavity Surface Emitting Laser (VCSEL). In some embodiments, the laser power, if said target is non-moving, is oscillating in a rate proportional to a rate of said modulation; wherein the laser power, if said target is moving, is oscillating in a rate proportional to said rate of modulation change and said target speed.

Some embodiments may provide a system that includes a self-mix laser unit comprising: an active region having a first side and a second, opposite, side; a p-type Distributed Bragg Reflector (DBR) region, which is in direct touch with said first side of said active region; an n-type DBR region, which is in direct touch with said second side of said active region; a substrate; a modulated heating current source, (a) to provide modulated current that passes laterally through a DBR-internal electrical resistor within at least one of (i) said p-type DBR region, (ii) said n-type DBR region, and (b) to directly provide modulated heat to said active region and to at least some DBR layers of the DBR region through which the modulated current passes. In some embodiments, said DBR-internal electrical resistor in non-touching the active region; wherein said DBR-internal electrical resistor in non-touching the substrate. In some embodiments, the DBR-internal electrical resistor receives triangular-modulated electrical current from a triangulate-modulated current source, and wherein the DBR-internal electrical resistor directly provides triangular-modulated heating to said active region to DBR layers that are in proximity to said DBR-internal electrical resistor. In some embodiments, the self-mix laser unit is part of a Vertical Cavity Surface Emitting Laser (VCSEL) which is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit; wherein said electrical resistor and said modulated heating current source operate to provide modulated heating that directly heats said active region and improves a quality of said laser-based self-mix signal; wherein said modulated heating operates to modulate a wavelength of the outgoing laser beam. In some embodiments, the laser power, if said target is non-moving, is oscillating in a rate proportional to a rate change of said modulation; wherein the laser power, if said target is moving, is oscillating in a rate proportional to said modulation change rate and said target speed.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A device comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a heating unit, directly touching said substrate, to receive modulated power and to indirectly provide modulated heat to at least said active region by generating heat that passes to the active region through the substrate;
wherein the self-mix laser unit is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit;
wherein said heating unit provides modulated heating that indirectly heats said active region and which improves a quality of said laser-based self-mix signal;
wherein said modulated heating operates to modulate a wavelength of the outgoing laser beam.

2. The device of claim 1,
wherein said heating unit in non-touching the n-type DBR region;
wherein said heating unit in non-touching the active region;
wherein said heating unit in non-touching the p-type DBR region.

3. The device of claim 1,
wherein said heating unit indirectly provides modulated heat to said active region via said substrate which has a thickness smaller than 100 micrometers.

4. The device of claim 1,
wherein the heating unit is an electrical resistor, which receives modulated current from a modulated current source, or which receives modulated voltage from a modulated voltage source.

5. A device comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a heating unit, directly touching said substrate, to receive modulated power and to indirectly provide modulated heat to at least said active region by generating heat that passes to the active region through the substrate;
wherein the heating unit is an electrical resistor, which receives triangular-modulated electrical power from a triangulate-modulated power source, and which indirectly provides triangular-modulated heating to said active region.

6. The device of claim 1,
wherein the self-mix laser unit is part of a Vertical Cavity Surface Emitting Laser (VCSEL).

7. A device comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a heating unit, directly touching said substrate, to receive modulated power and to indirectly provide modulated heat to at least said active region by generating heat that passes to the active region through the substrate;
wherein a laser power of said self-mix laser unit, if said target is non-moving, is oscillating in a rate proportional to a change rate of said modulation;
wherein the laser power of said self-mix laser unit, if said target is moving, is oscillating in a rate proportional to said rate of modulation change and said target speed.

8. An apparatus comprising:
a self-mix laser unit comprising:
an active region having a first side and a second, opposite, side;
a top side Distributed Bragg Reflector (DBR) region, which is in direct touch with said first side of said active region;
a bottom side DBR region, which is in direct touch with said second side of said active region;
a substrate;
a heating unit, directly touching said tope side DBR region, to receive modulated power and to indirectly provide modulated heat to at least said active region via said top side DBR region;

wherein the self-mix laser unit is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit;

wherein said heating unit provides modulated heating that indirectly heats at least said active region and which improves a quality of said laser-based self-mix signal;

wherein said modulated heating operates to modulate a wavelength of the outgoing laser beam.

9. The apparatus of claim 8,
wherein said heating unit in non-touching the active region;
wherein said heating unit in non-touching the substrate.

10. The apparatus of claim 8,
wherein the heating unit is an electrical resistor, which receives modulated current from a modulated current source, or which receives modulated voltage from a modulated voltage source.

11. An apparatus comprising:
a self-mix laser unit comprising:
an active region having a first side and a second, opposite, side;
a top side Distributed Bragg Reflector (DBR) region, which is in direct touch with said first side of said active region;
a bottom side DBR region, which is in direct touch with said second side of said active region;
a substrate;
a heating unit, directly touching said tope side DBR region, to receive modulated power and to indirectly provide modulated heat to at least said active region via said top side DBR region;
wherein the heating unit is an electrical resistor, which receives triangular-modulated electrical power from a triangulate-modulated power source, and which indirectly provides triangular-modulated heating to at least said active region via said top-side DBR region.

12. The apparatus of claim 8,
wherein the self-mix laser unit is part of a Vertical Cavity Surface Emitting Laser (VCSEL).

13. An apparatus comprising:
a self-mix laser unit comprising:
an active region having a first side and a second, opposite, side;
a top side Distributed Bragg Reflector (DBR) region, which is in direct touch with said first side of said active region;
a bottom side DBR region, which is in direct touch with said second side of said active region;
a substrate;
a heating unit, directly touching said tope side DBR region, to receive modulated power and to indirectly provide modulated heat to at least said active region via said top side DBR region;
wherein a laser power of said self-mix laser unit, if said target is non-moving, is oscillating in a rate proportional to a rate of said modulation;
wherein the laser power of said self-mix laser unit, if said target is moving, is oscillating in a rate proportional to said rate of modulation change and said target speed.

14. A system comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a modulated heating current source, (a) to provide modulated current that passes laterally through a DBR-internal electrical resistor within at least one of (i) said p-type DBR region, (ii) said n-type DBR region, and (b) to directly provide modulated heat to said active region and to at least some DBR layers of the DBR region through which the modulated current passes;
wherein the DBR-internal electrical resistor receives triangular-modulated electrical current from a triangulate-modulated current source, and wherein the DBR-internal electrical resistor directly provides triangular-modulated heating to said active region to DBR layers that are in proximity to said DBR-internal electrical resistor.

15. The system of claim 14,
wherein said DBR-internal electrical resistor in non-touching the active region;
wherein said DBR-internal electrical resistor in non-touching the substrate.

16. A system comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a modulated heating current source, (a) to provide modulated current that passes laterally through a DBR-internal electrical resistor within at least one of (i) said p-type DBR region, (ii) said n-type DBR region, and (b) to directly provide modulated heat to said active region and to at least some DBR layers of the DBR region through which the modulated current passes;
wherein the self-mix laser unit is part of a Vertical Cavity Surface Emitting Laser (VCSEL) which is configured (a) to transmit an outgoing laser beam towards a target, and (b) to receive optical feedback reflected back from said target upon said target being hit by said laser beam, and (c) to perform, within said self-mix laser unit, laser-based self-mix of the outgoing laser beam and the optical feedback reflected back from said target, and (d) to remotely determine one or more attributes of said target based on analysis of a laser-based self-mix signal within said self-mix laser unit;
wherein said electrical resistor and said modulated heating current source operate to provide modulated heating that directly heats said active region and improves a quality of said laser-based self-mix signal;
wherein said modulated heating operates to modulate a wavelength of the outgoing laser beam.

17. A system comprising:
a self-mix laser unit comprising:
an active region having a first side and a second, opposite, side;
a p-type Distributed Bragg Reflector (DBR) region, which is in direct touch with said first side of said active region;
an n-type DBR region, which is in direct touch with said second side of said active region;
a substrate;
a modulated heating current source, (a) to provide modulated current that passes laterally through a DBR-internal electrical resistor within at least one of (i) said p-type DBR region, (ii) said n-type DBR region, and (b) to directly provide modulated heat to said active region and to at least some DBR layers of the DBR region through which the modulated current passes;
wherein a laser power of said self-mix laser unit, if said target is non-moving, is oscillating in a rate proportional to a rate change of said modulation;
wherein the laser power of said self-mix laser unit, if said target is moving, is oscillating in a rate proportional to said modulation change rate and said target speed.

\* \* \* \* \*